(12) United States Patent
Liu et al.

(10) Patent No.: US 10,927,916 B2
(45) Date of Patent: Feb. 23, 2021

(54) EASY-TO-MAINTAIN FRAME-TYPE ENERGY-ABSORPTION STRUCTURE

(71) Applicant: SHENZHEN CANSINGA TECHNOLOGY CO., LTD., Guangdong (CN)

(72) Inventors: Zhaojing Liu, Guangdong (CN); Changjie Luo, Guangdong (CN); Wei Wei, Guangdong (CN); Wenze Yu, Guangdong (CN)

(73) Assignee: SHENZHEN CANSINGA TECHNOLOGY CO., LTD., Guangdong (CN)

( * ) Notice: Subject to any disclaimer, the term of this patent is extended or adjusted under 35 U.S.C. 154(b) by 360 days.

(21) Appl. No.: 15/781,888

(22) PCT Filed: Dec. 14, 2017

(86) PCT No.: PCT/CN2017/116158
§ 371 (c)(1),
(2) Date: Jun. 6, 2018

(87) PCT Pub. No.: WO2018/121270
PCT Pub. Date: Jul. 5, 2018

(65) Prior Publication Data
US 2020/0271180 A1  Aug. 27, 2020

(30) Foreign Application Priority Data

Dec. 26, 2016  (CN) .......................... 201611217980.6

(51) Int. Cl.
*F16F 7/00* (2006.01)
*F16F 7/12* (2006.01)
(Continued)

(52) U.S. Cl.
CPC .............. *F16F 7/003* (2013.01); *F16F 7/126* (2013.01); *B60R 19/18* (2013.01); *B61F 19/04* (2013.01)

(58) Field of Classification Search
CPC  F16F 7/003; F16F 7/126; B60K 19/18; B61F 19/04; B61D 17/00; B61D 15/06
See application file for complete search history.

(56) References Cited

U.S. PATENT DOCUMENTS 2,213,455 A * 9/1940 Abkowitz ............... B61F 19/04
213/9
3,843,180 A * 10/1974 Alexander .............. B60R 19/14
293/150

(Continued)

FOREIGN PATENT DOCUMENTS

CN  102464002 A  5/2012
CN  103303334 A  9/2013

(Continued)

OTHER PUBLICATIONS

International Search Report and Written Opinion issued in PCT/CN2017/116158, dated Feb. 13, 2018, total 11 pages.

*Primary Examiner* — Melanie Torres Williams
(74) *Attorney, Agent, or Firm* — Hamre, Schumann, Mueller & Larson, P.C.

(57) ABSTRACT

An easy-to-maintain frame-type energy-absorption structure, including: a fixing frame, anti-climber which are arranged at the front of the bottom of the fixing frame, energy absorption block which are detachably connected with the fixing frame and the anti-climber respectively, a connecting device for hinging the anti-climber and the fixing frame, and shear pins which are respectively arranged at a junction of the connecting device and the fixing frame, and a junction of the connecting device and the anti-climber. So that changing the traditional whole welded frame type (Continued)

energy absorbing device into an easy-to-maintain frame-type energy-absorption structure, and when a collision occurs, protecting the fixing frame from being damaged, and the energy absorption block can be replaced to achieve reuse it.

8 Claims, 6 Drawing Sheets

(51) Int. Cl.
　　*B60R 19/18*　　　(2006.01)
　　*B61F 19/04*　　　(2006.01)

(56) References Cited

U.S. PATENT DOCUMENTS

| | | | |
|---|---|---|---|
| 6,092,959 A * | 7/2000 | Leonhardt | B60R 19/00 256/13.1 |
| 6,244,637 B1 | 6/2001 | Leonhardt et al. | |
| 6,685,040 B2 * | 2/2004 | Heinisch | B61D 15/06 105/392.5 |
| 6,820,759 B1 * | 11/2004 | Schindler | B61G 11/16 213/221 |
| 2004/0251698 A1 * | 12/2004 | Welch | E01F 15/148 293/133 |
| 2008/0250965 A1 * | 10/2008 | Clark | B61D 17/06 105/413 |
| 2009/0058109 A1 * | 3/2009 | Mattschull | B60R 19/14 293/102 |
| 2013/0239847 A1 * | 9/2013 | Taguchi | B61D 15/06 105/392.5 |
| 2015/0345089 A1 * | 12/2015 | Doerr | E01H 8/10 104/279 |

FOREIGN PATENT DOCUMENTS

| | | |
|---|---|---|
| CN | 104912417 A | 9/2015 |
| CN | 105270430 A | 1/2016 |
| CN | 106515780 A | 3/2017 |

* cited by examiner

EASY-TO-MAINTAIN FRAME-TYPE ENERGY-ABSORPTION STRUCTURE

TECHNICAL FIELD

The present application relates to the technical field of energy-absorption devices, and more particularly to an easy-to-maintain frame-type energy-absorption structure.

BACKGROUND

With the rapid development of our country's rail transportation and other fields, accompanying security problems have been increasingly valued by people. When collision accidents of rail vehicles, school buses or the like occur, heavy casualties and property losses are often caused. The accidents such as train collisions in recent years fully demonstrate that even in a series of measures of active protection such as signal control, dispatch management, program management or the like are adopted, the collision accidents of the trains cannot be completely avoided. Thus, the performance of the passive safety protection device as the ultimate guardian of the life and property safety of the passengers is particularly important.

Statistics show that collisions of rail vehicles or the like are often accompanied with a "vehicle climbing" phenomenon, and once the "vehicle climbing" occurs, the death rate caused by the accident is 3-4 times higher than that without the "vehicle climbing". In order to reduce the probability of the "vehicle climbing" phenomenon, an easy-to-maintain frame-type energy-absorption structure is usually installed at ends of a vehicle, and sufficient vertical bearing capacity is required. The vertical bearing capacity is an important indicator of passive safety protection performance for rail vehicles. With the constantly increasing speed of rail vehicles, the requirement for this indicator may also be higher and higher. The existing rail vehicle is often equipped with a single energy-absorption element, such as planed anti-climber, drawer-type honeycomb anti-climber, and expansion-pipe anti-climber at the end thereof, as the single energy-absorption element is often limited by its own structural features and installation space, and the potential for improving the vertical bearing capacity is limited; While for those adopting a welded frame-type energy-absorption structure having an embedded non-removable energy absorption box, the vertical load is brought from a large frame structure during operation, and the vertical bearing capacity is significantly improved. However, due that the welded frame structure is a monolithic structure, the entire front end of the vehicle must be replaced when the collision accident causes deformation of a load beam and other parts of the structure, or even the entire carriage be scrapped, which not only require a long maintenance cycle, but also causes great economic loss to the vehicle operator.

SUMMARY

An object of the present application is to provide an easy-to-maintain frame-type energy-absorption structure in order to solve the technical problem that the vertical bearing capacity of an energy-absorption element is week, and a whole welded frame type energy absorbing structure cannot be maintained after being deformed, it needs to be replaced as a whole.

The present application provides an easy-to-maintain frame-type energy-absorption structure, comprising: a fixing frame, anti-climber arranged in the front of the bottom of the fixing frame, an energy absorption block detachably connected with the fixing frame and the anti-climber respectively, a connecting device for hinging the anti-climber and the fixing frame, and shear pins which are respectively arranged at a junction of the connecting device and the fixing frame, and a junction of the connecting device and the anti-climber.

Further, a length of the anti-climber is shorter than a length of the fixing frame, and a center of the bottom of the fixing frame is connected with a center of the anti-climber via the energy absorption block.

Further, the connecting device comprises: first hinging devices that are arranged at both ends of the anti-climber, and hinge the anti-climber to both ends of the fixing frame; and each of the first hinging devices comprises a first convex portion which is arranged at the bottom of the fixing frame, and a first hinge which is respectively hinged to the first convex portion and the anti-climber.

Further, the first hinge comprises a first hinging portion and a second hinging portion that are sequentially arranged between the fixing frame and the anti-climber; the first hinging portion comprise two U-shaped grooves with openings facing opposite directions, and a first connection portion for connecting the bottoms of the two U-shaped grooves; and the first convex portion matches with the U-shaped groove, and a top surface and a bottom surface of the first convex portion contact with the side walls of the U-shaped groove.

Further, the first hinging portion further comprises a pin vertically passing through the U-shaped groove and the first convex portion, and a shear pin for connecting a top portion of the first convex portion with a side wall of the U-shaped groove, and the shear pin and the pin are spaced.

Further, the second hinging portion comprises a second connection portion matching with the U-shaped groove, and a first U-shaped groove for hinging the second connection portion and the anti-climber and for accommodating the anti-climber.

Further, the connecting device further comprises: one or more pillar(s) that are arranged at the anti-climber, and one or more second hinges for hinging the top bottom of the fixing frame with the pillars.

Further, the easy-to-maintain frame-type energy-absorption structure further comprises one or more beam(s) that are vertically arranged at the pillars; the beams are hinged with the fixing frame via a third hinge; and the third hinge has the same structure as the first hinge.

Further, the second hinge comprise: a second convex portion, a third hinging portion, a fourth hinging portion, and a T-shaped hinging portion that are sequentially hinged; and the second convex portion is obliquely arranged at the top of the fixing frame, and the T-shaped hinging portion is arranged at the top of the pillar and is cooperated with the fourth hinging portion.

Further, the third hinging portion has the same structure as the first third hinging portion; and both the left and right sides wall of the second convex portion contract with the third hinging portion.

The easy-to-maintain frame-type energy-absorption structure of the present application has the following beneficial effects: the fixing frame is designed as a square shape, the both ends and the top portion of the anti-climber are hinged with the fixing frame through the connecting device, thereby changing the traditional integral welded frame type energy absorbing device into the easy-to-maintain frame-type energy-absorption structure, and the degree of freedom of the anti-climber in the vertical direction are limited, which improves the vertical bearing capacity of the easy-to-maintain frame-type energy-absorption structure as a whole, and energy absorption block is detachably inserted in the easy-to-maintain frame-type energy-absorption structure, and improving the maintainable of the easy-to-maintain frame-type energy-absorption structure. When the vehicle crashes, the energy absorption block are stacked and deformed in the horizontal direction to absorb the impact energy. At the same time, under the effect of the impact load, the shear pin is sheared, and the connecting device generates a rotating motion to protect the fixing frame being damaged. After the collision, the shear pin can be manually reinstalled to reset the connecting device, and the energy absorption block is replaced to achieve reuse of the easy-to-maintain frame-type energy-absorption structure, so that the maintenance period is short.

BRIEF DESCRIPTION OF THE DRAWINGS

In order to make the technical solutions in the embodiments of the present application clearer, the accompanying drawings to be used in the embodiments and the description of the prior art will be briefly introduced below, it is apparent that the drawings in the following description are merely some embodiments of the present application and that other drawings may be obtained by those skilled in the field without departing from the inventive nature of the invention.

DETAILED DESCRIPTION OF THE EMBODIMENTS

Figure 1:
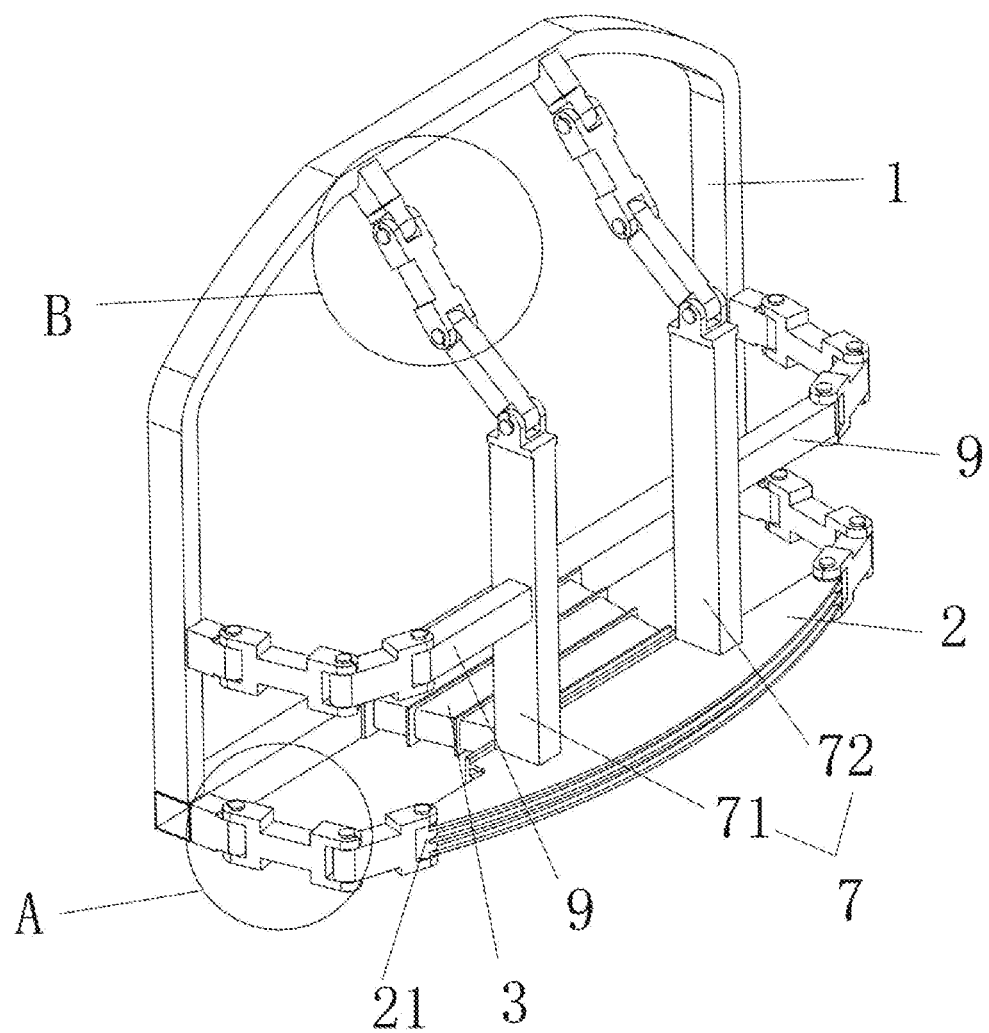
FIG. 1 is a reference view of the in-use state of an easy-to-maintain frame-type energy-absorption structure provided by an embodiment of the present application when it is not impacted.

In order to make the technical problems to be solved, technical solutions, and beneficial effects of the present application clearer and more understandable, the present application will be further described in detail herein after with reference to the accompanying drawings and embodiments. It should be understood that the embodiments described herein are only intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component.

It should be understood that, "length", "width", "upper", "lower", "front", "back", "left" and "right", "vertical", "horizontal", "top", "bottom", "inside", "outside" and other terms indicating the orientation or positional relationship are based on orientation or positional relationship shown in the drawings, and are only for the purpose of facilitating the description of the application and simplifying the description, instead of indicating or implying that the indicated device or component must have a specific orientation and constructed and operated in a particular orientation, and therefore it cannot be construed as limitation of the application.

Please refer to FIGS. 1 to 6, the present application provides an easy-to-maintain frame-type energy-absorption structure, as shown in FIG. 1, comprising: a fixing frame 1, anti-climber 2 arranged in the front of the bottom of the fixing frame 1, an energy absorption block 3 detachably connected with the fixing frame 1 and the anti-climber 2 respectively, a connecting device for hinging the anti-climber 2 and the fixing frame 1, and shear pins 4 which are respectively arranged at a junction of the connecting device and the fixing frame 1, and a junction of the connecting device and the anti-climber 2.

The fixing frame 1 is designed as a square shape, the both ends and a top portion of the anti-climber 2 is hinged with the fixing frame 1 via the connecting device, thereby changing the traditional integrally welded frame type energy absorbing device into an easy-to-maintain frame-type energy-absorption structure, and the energy absorption block 3 is detachably embedded in the easy-to-maintain frame-type energy-absorption structure, and improving the maintainable of the easy-to-maintain frame-type energy-absorption structure. When the vehicle crashes, the energy absorption block 3 is stacked and deformed in a horizontal direction to absorb the impact energy. At the same time, under the effect of the impact load, the shear pin is sheared, and the connecting device generates a rotating motion to protect the fixing frame 1 from being damaged. After the collision, the shear pin can be manually reinstalled to reset the connecting device, and the energy absorption block 3 is replaced to achieve reuse of the easy-to-maintain frame-type energy-absorption structure, therefore the maintenance period is short.

Further, a length of the anti-climber 2 is shorter than a length of the fixing frame 1, and a center of a bottom of the fixing frame 1 is connected with the center of the anti-climber 2 via the energy absorption block 3. That is, the anti-climber 2 is located in the center of the bottom of the fixing frame 1.

The connecting device comprises first hinging devices arranged at both ends of the anti-climber 2 and hinging the anti-climber 2 to both ends of the fixing frame 1; and each of the first hinging devices comprises a first convex portion 5 which is arranged at the bottom of the fixing frame 1, and a first hinge 6 which is respectively hinged to the first convex portion 5 and the anti-climber 2.

Due that the anti-climber 2 is located at the center of the fixing frame 1, a distance between a left end of the anti-climber 2 and a left end of the bottom of the fixing frame 1 is equal to a distance between the right end of the anti-climber 2 and a right end of the bottom of the fixing frame 1. When both ends of the anti-climber 2 is hinged with both ends of the fixing frame 1 via the first hinging device, once the vehicles collides and results in the movement of the anti-climbing tooth 2 in a direction towards the fixing frame 1, the first hinging device arranged at the left end of the anti-climber 2 and the first hinging device at the right end of the anti-climber 2 is symmetrically moved to allow the anti-climber 2 to move toward the fixing frame 1 in a straight direction without skewing; at the same time, the compression of the energy absorption block 3 can also keep the balance to improve the effect of absorbing the collision energy.

Figure 2:
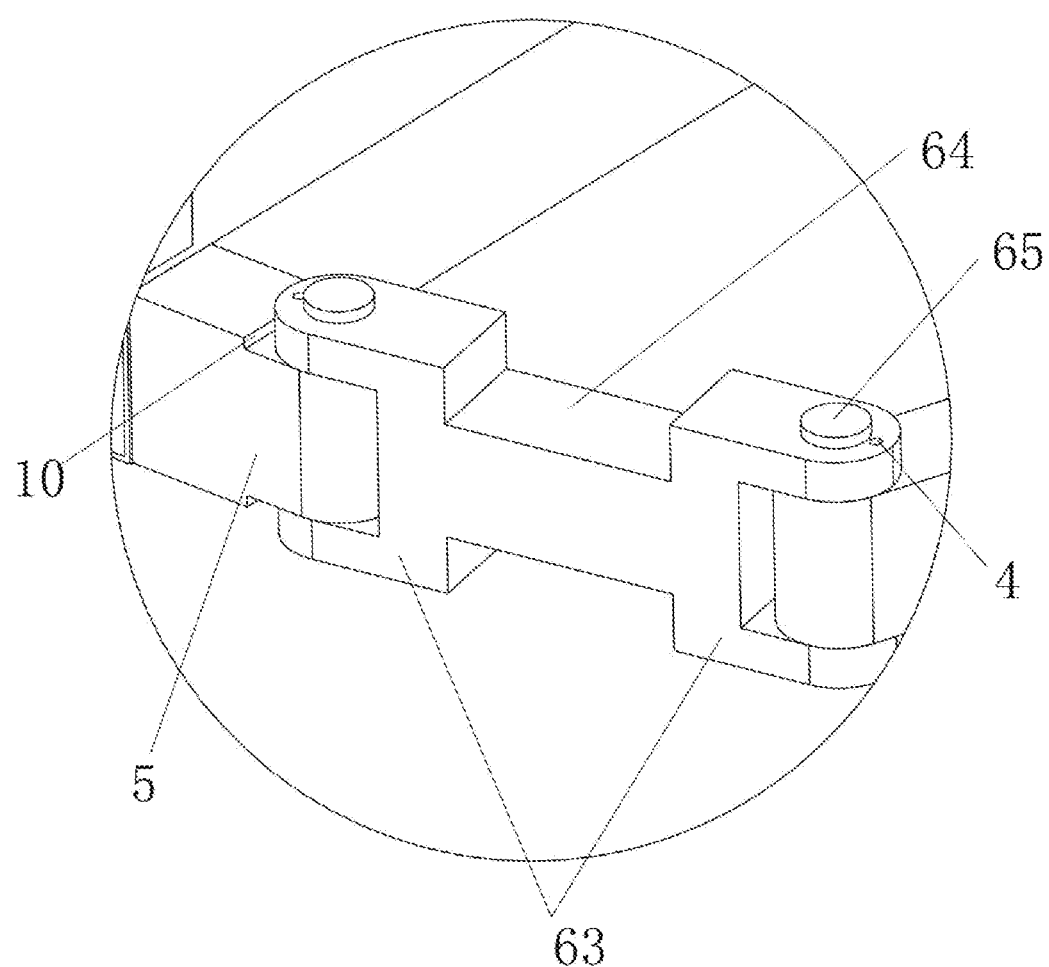
FIG. 2 is a partial enlarged view of part A of FIG. 1.

Referring to FIG. 2, the first hinge 6 comprises a first hinging portion 61 and a second hinging portion 62 that are sequentially arranged between the fixing frame 1 and the anti-climber 2; the first hinging portion 61 comprises two U-shaped grooves 63 with openings facing opposite directions, and a first connection portion 64 for connecting the bottoms of the two U-shaped grooves 63; and the first convex portion 61 matches with the U-shaped groove 63, and a top surface and a bottom surface of the first convex portion 5 contact with the side walls of the U-shaped groove 63.

Figure 4:
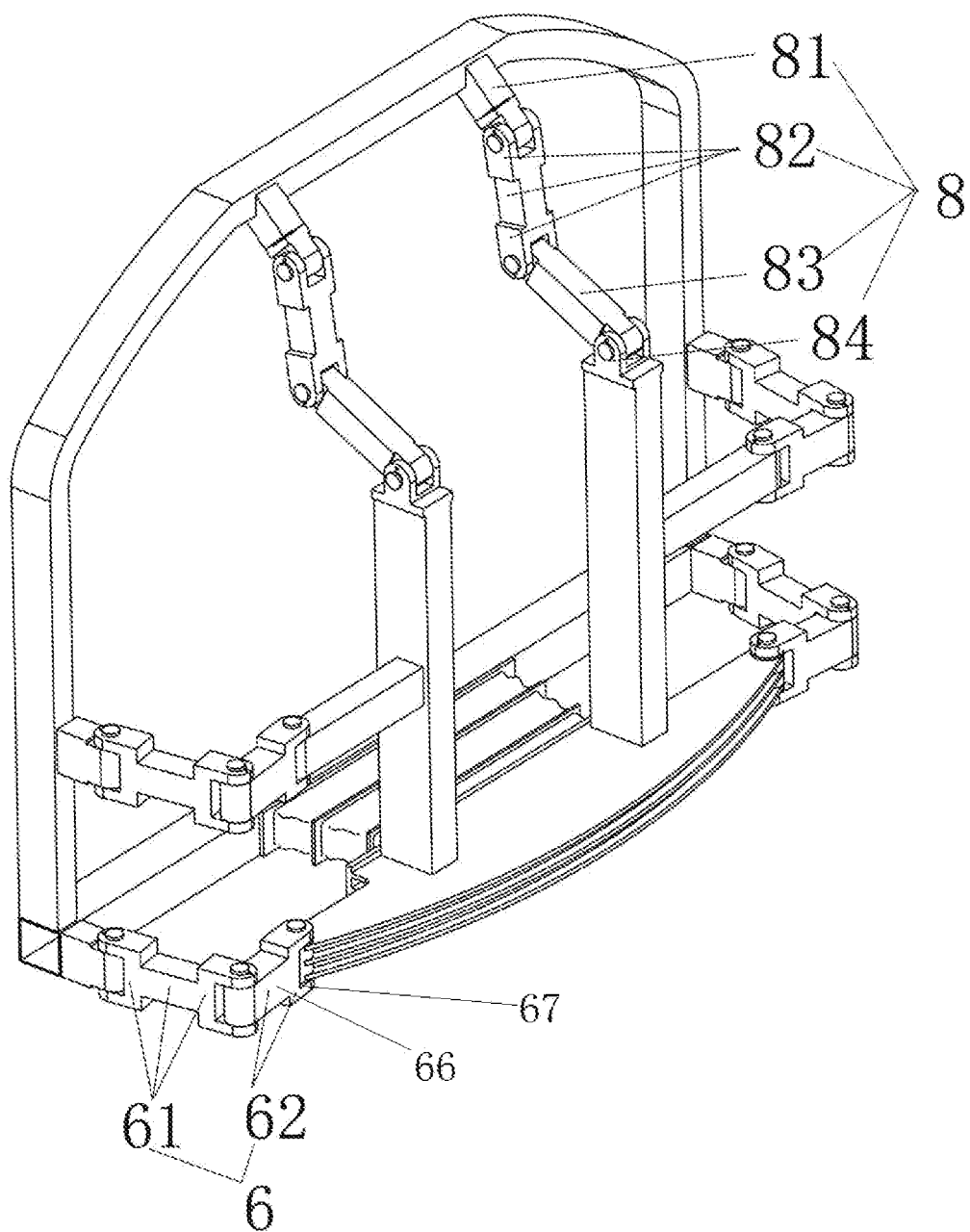
FIG. 4 is a reference view of a first in-use state of an easy-to-maintain frame-type energy-absorption structure provided by the embodiment of the present application when it is impacted.
Figure 5:
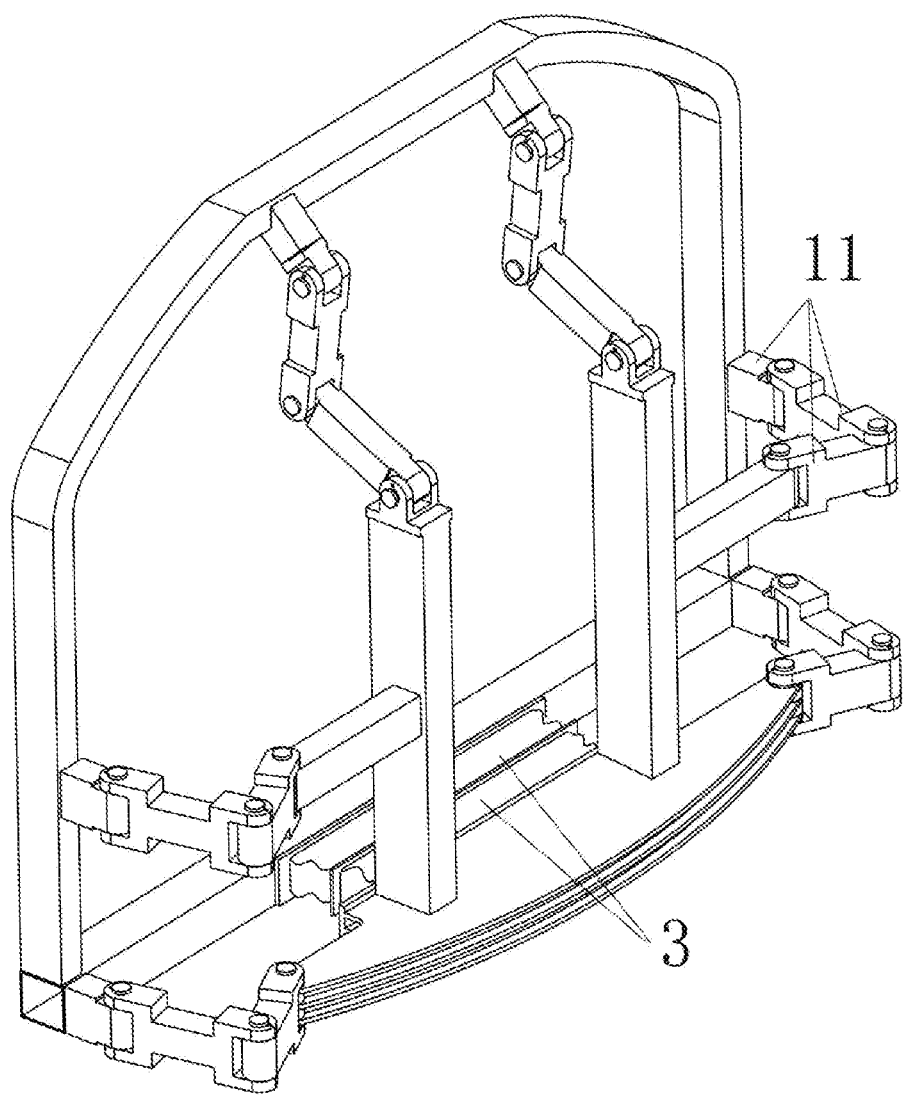
FIG. 5 is a reference view of a second in-use state of an easy-to-maintain frame-type energy-absorption structure provided by the embodiment of the present application when it is impacted.
Figure 6:
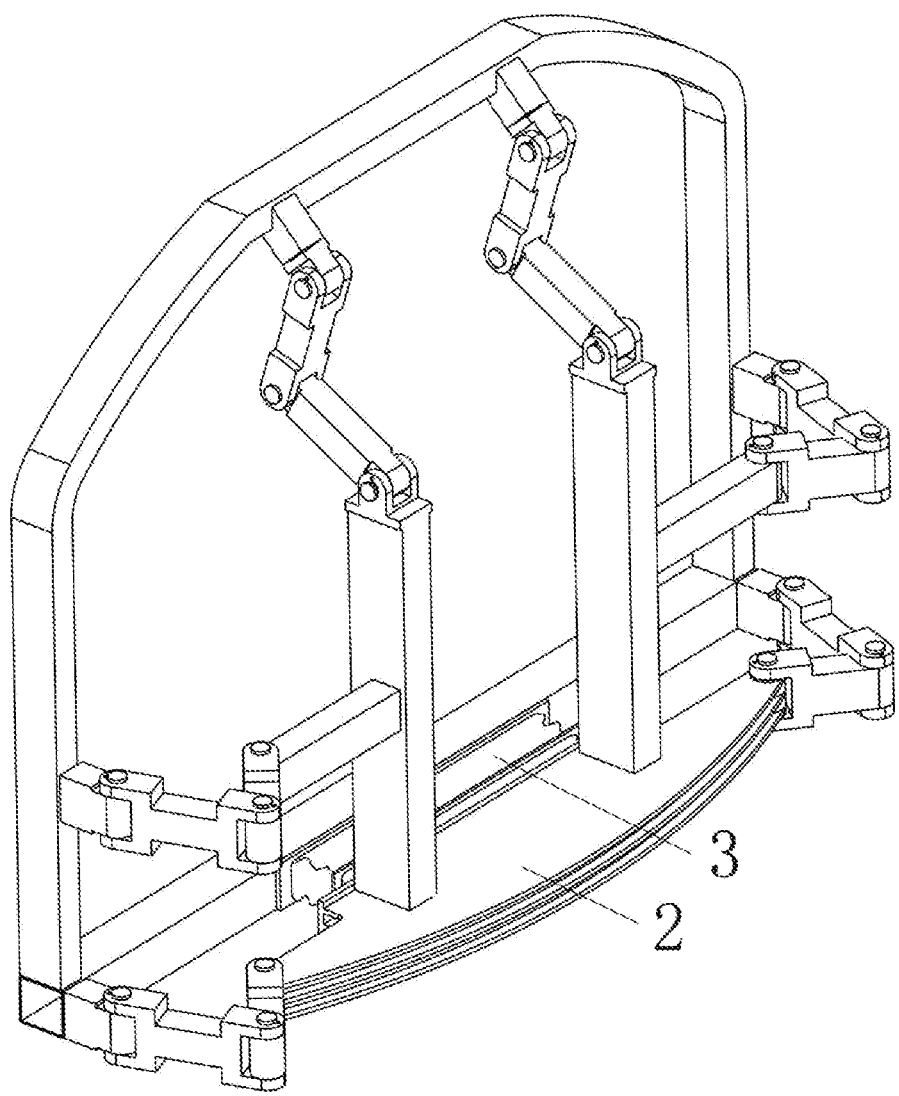
FIG. 6 is a reference view of a third in-use state of an easy-to-maintain frame-type energy-absorption structure provided by the embodiment of the present application when it is impacted.

The first convex portion 5 and the fixing frame 1 are made as a monolithic structure, and the first convex portion 5 is perpendicular to the fixing frame 1. Due that the top surface and the bottom surface of the first convex portion 5 contact with the side walls of the U-shaped groove 63, the first hinging portion 61 can only be horizontally rotated relative to the first convex portion 5 under the collision force from collision; the first convex portion 5 is connected at the U-shaped groove 63 for vertically limiting the first hinging portion 61. the first hinging portion 61 further comprises: a pin 65 vertically passing through the U-shaped groove 63 and the first convex portion 5, and a shear pin for connecting a top portion of the first convex portion 5 and a side wall of the U-shaped groove 63; and the shear pin and the pin 65 are spaced. When no collision occurs, the first hinge 6 is positioned by the shear pin, the first hinging portion 61 cannot rotate relative to the first convex portion 5, the first hinging portion 61 and the second hinging portion 62 cannot rotate relative to each other, and the anti-climber 2 and the fixing frame 1 are fixedly connected via the first hinge 6; when a collision occurs, the shear pin is broken, as shown in FIGS. 4 to 6, the first hinging portion 61 and the second hinging portion 62 rotate relative to each other, which not only ensures that the anti-climber 2 and the fixing frame 1 are fixedly connected, but also protects the first hinge 6 from being broken under the collision force, thereby ensuring that the fixed frame 1 will not be damaged.

The second hinging portion 62 comprise a second connection portion 66 matching with the U-shaped groove 63, and a first U-shaped grooves 67 for hinging the second connection portion 66 and with the anti-climber 2 and for accommodating the anti-climber 2. Preferably, both ends of the anti-climber 2 are vertically provided with sleeves 21, the pin can pass through the sleeve 21, and the sleeve 21 can be accommodated in the first U-shaped groove 67; both ends of the anti-climber 2 are provided with sleeves 21 which are used for hinging the anti-climber 2 with the second hinging portion 62 to enhance the firmness between the anti-climber 2 and the second hinging portion 62. The first hinge 6 is provided with three hinge points: which are between the first hinging portion 61 and the first convex portion 5, between the first hinging portion 61 and the second hinging portion 62, and between the second hinging portion 62 and the anti-climber 2, so as to ensure that the number of parts is minimized as much as possible and ensure the flexibility of hinging between the anti-climber 2 and the fixed frame 1.

Figure 3:
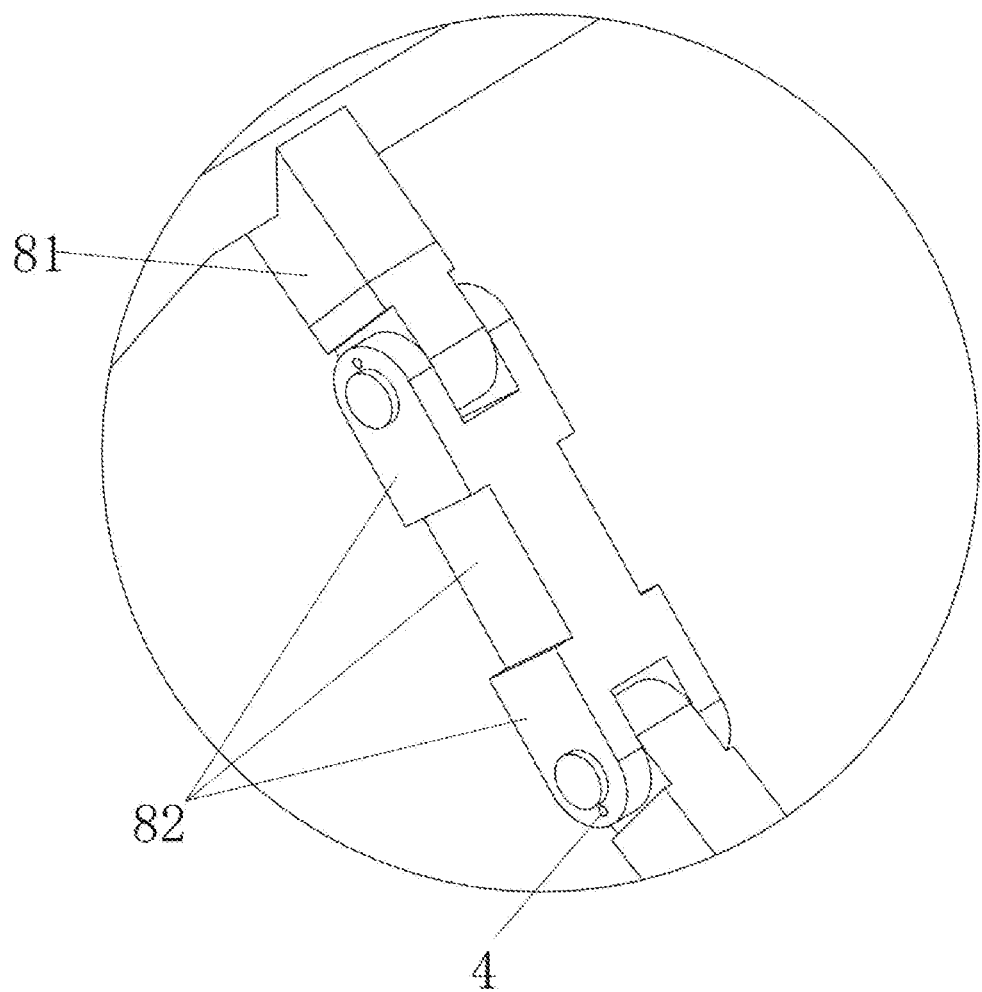
FIG. 3 is a partial enlarged view of part B of FIG. 1.

The connecting device further comprises: one or more pillar(s) 7 that are arranged at the anti-climber 2, and one or more second hinge(s) 8 for hinging the top portion of the fixing frame 1 with the pillars 7. As shown in FIG. 3, the second hinge 8 comprises a second convex portion 81, a third hinging portion 82, a fourth hinging portion 83, and a T-shaped hinging portion 84 that are sequentially hinged; the second convex portion 82 is obliquely arranged at the top of the fixing frame 1, the T-shaped hinging portion 84 is arranged at the top of the pillar 7. Preferably, the pillar 7 comprises a first pillar 71 and a second pillar 72; the first pillar 71 and the second pillar 72 are spacedly arranged at the top of the anti-climber 2.

An extension line of the second convex portion 81 and the pillar 7 intersect at the top surface of the pillar 7; the top surface of the anti-climber 2 and the fixing frame 1 are hinged via the pillar 7 and the second hinge 8, and when no collision occurs, the second convex portion 81, the third hinging portion 82, and the fourth hinging portion 83 are in a straight line. Preferably, the third hinging portion 82 has the same structure as the first hinging portion 61; both left side wall and right side wall of the second convex portion 81 are contacted with the third hinging portion 82, that is the relative rotation between the third hinging portion 82 and the fourth hinging portion 83 is a vertical rotation. The second hinge 8 is also provided with three hinge points, and the three hinge points are provided with shear pins. When no collision occurs, a top surface of the anti-climber 2 and a top portion of the fixing frame 1 are connected via the second hinge 8, and the both left and right ends of the anti-climber 2 are connected to the both left and right ends of the fixing frame 1 via the first hinge 6, so that the position of the anti-climber 2 is fixed and cannot move relative to the fixing frame 1; and when the collision occurs, as shown in FIGS. 4 to 6, the shear pins on the first hinge 6 and the second hinge 8 are both broken, relative rotation are generated between the first hinging portion 61 and the second hinging portion 62, and between the third hinging portion 82 and the fourth hinging portion 83, which can protect the easy-to-maintain frame-type energy-absorption structure from being crushed and can be restored after the collision.

A limitation of the first convex portion 5 towards the first hinging portion 61 in a vertical direction, a limitation of the first hinging portion 61 towards the second hinging portion 62 in a vertical direction, and a limitation of the second hinge 8 and the pillar towards the anti-climber 2 in a vertical direction prevent the easy-to-maintain frame-type energy-absorption structure from being moving in the vertical direction, allow the easy-to-maintain frame-type energy-absorption structure to withstand the vertical load while colliding, thus improving its vertical bearing capacity.

The easy-to-maintain frame-type energy-absorption structure further comprises one or more beam(s) 9 that are vertically arranged at the pillars; the beams 9 are hinged with the fixing frame 1 via a third hinge 11; and the third hinge 11 has the same structure as the first hinge 6. The beam 9 on the first pillar is arranged at the side from the second pillar, the beam 9 on the second pillar is arranged at the side from the first pillar. The beam is added at the pillar, and hinging the beam and the fixing frame 1 via the third hinge for allowing the third hinge, the beam, the pillar, the second hinge 8 and the fixing frame 1 to form a triangle, which improves the firmness of the connection between the anti-climber 2 and the fixing frame 1, and limiting degree of freedom of the easy-to-maintain frame-type energy-absorption structure in the vertical direction, and further enhances the vertical carrying capacity of the easy-to-maintain frame-type energy-absorption structure.

Preferably, the first convex portion 5 further comprises a convex rib 10; the convex rib 10 is located between fixing frame 1 and the first hinging portion 61. The convex rib 10 is used for limiting the first hinging portion 61, therefore when a collision occurs while the first hinging portion 61 rotates relative to the first convex portion 5, the motivation between the first convex portion 5 and the first hinging portion 61 will not lead to relative misalignment.

In summary, the present application provides the easy-to-maintain frame-type energy-absorption structure, comprising: the fixed frame 1, the anti-climber 2 arranged in the front of the bottom of the fixing frame 1, the energy absorption block 3 detachably connected with the fixing frame 1 and the anti-climber 2 respectively, the connecting device for hinging the anti-climber 2 and the fixing frame 1, and shear pins 4 which are respectively arranged at the junction of the connecting device and the fixing frame 1, and the junction of the connecting device and the anti-climber 2. The fixing frame 1 is designed as a square shape, the both ends and the top portion of the anti-climber 2 are hinged with the fixing frame 1 through the connecting device, thereby changing the traditional integral welded frame type energy absorbing device into the easy-to-maintain frame-type energy-absorption structure, and the degree of freedom of the anti-climber 2 in the vertical direction are limited, which improves the vertical bearing capacity of the easy-to-maintain frame-type energy-absorption structure as a whole, and energy absorption block 3 is detachably inserted in the easy-to-maintain frame-type energy-absorption structure, and improving the maintainable of the easy-to-maintain frame-type energy-absorption structure. When the vehicle crashes, the energy absorption block 3 are stacked and deformed in the horizontal direction to absorb the impact energy. At the same time, under the effect of the impact load, the shear pin is sheared, and the connecting device generates a rotating motion to protect the fixing frame 1 being damaged. After the collision, the shear pin can be manually reinstalled to reset the connecting device, and the energy absorption block 3 is replaced to achieve reuse of the easy-to-maintain frame-type energy-absorption structure, so that the maintenance period is short.

The aforementioned embodiments are only preferred embodiments of the present application, and are not intended to limit the present application. Any modification, equivalent replacement, improvement, and so on, which are made within the spirit and the principle of the present application, should be comprised in the scope of the present application.

The invention claimed is:

1. An easy to maintain frame typo energy-absorption structure, comprising:
   a fixing frame,
   an anti-climber arranged in front of the bottom of the fixing frame,
   an energy absorption block detachably connected with the fixing frame and the anti-climber respectively,
   a connecting device for hinging the anti-climber and the fixing frame, and
   shear pins which are respectively arranged at a junction of the connecting device and the fixing frame and a junction of the connecting device and the anti-climber;
   wherein the connecting device comprises: first hinging devices that are arranged at both ends of the anti-climber, and hinge the anti-climber to both ends of the fixing frame; and each of the first hinging devices comprises a first convex portion which is arranged at the bottom of the fixing frame, and a first hinge which is respectively hinged to the first convex portion and the anti-climber; and
   wherein the first hinge comprises a first hinging portion and a second hinging portion that are sequentially arranged between the fixing frame and the anti-climber; the first hinging portion comprise two U-shaped grooves with openings facing opposite directions, and a first connection portion for connecting the bottoms of the two U-shaped grooves; and the first convex portion matches with the U-shaped groove, and a top surface and a bottom surface of the first convex portion contact with the side walls of the U-shaped groove.

2. The energy-absorption structure of claim 1, wherein, a length of the anti-climber is shorter than a length of the fixing frame, and a center of the bottom of the fixing frame is connected with a center of the anti-climber via the energy absorption block.

3. The energy-absorption structure of claim 1, wherein, the first hinging portion further comprises a pin vertically passing through the U-shaped groove and the first convex portion, and a shear pin for connecting a top portion of the first convex portion with a side wall of the U-shaped groove, and the shear pin and the pin are spaced.

4. The energy-absorption structure of claim 1, wherein, the second hinging portion comprises a second connection portion matching with the U-shaped groove, and a first U-shaped groove for hinging the second connection portion and the anti-climber and for accommodating the anti-climber.

5. The energy-absorption structure of claim 1, wherein, the connecting device further comprises: one or more pillar (s) that are arranged at the anti-climber, and one or more second hinges for hinging the top bottom of the fixing frame with the pillars.

6. The energy-absorption structure of claim 5, wherein, the energy-absorption structure further comprises one or more beam(s) that are vertically arranged at the pillars; the beams are hinged with the fixing frame via a third hinge; and the third hinge has the same structure as the first hinge.

7. The energy-absorption structure of claim 5, wherein, the second hinge comprise: a second convex portion, a third hinging portion, a fourth hinging portion, and a T-shaped hinging portion that are sequentially hinged; and the second convex portion is obliquely arranged at the top of the fixing frame, and the T-shaped hinging portion is arranged at the top of the pillar and is cooperated with the fourth hinging portion.

8. The energy-absorption structure of claim 7 wherein, the third hinging portion has the same structure as the first hinging portion; and both the left and right sides wall of the second convex portion contract with the third hinging portion.

* * * * *